United States Patent [19]
Litman

[11] Patent Number: 5,834,748
[45] Date of Patent: Nov. 10, 1998

[54] TRANSACTIONAL ITEM WITH NON-PARALLEL MAGNETIC ELEMENTS

[75] Inventor: Mark A. Litman, Edina, Minn.

[73] Assignee: Aveka, Inc., Woodbury, Minn.

[21] Appl. No.: 651,157

[22] Filed: May 17, 1996

[51] Int. Cl.⁶ .............................. G06K 7/03; G06K 19/06
[52] U.S. Cl. ....................... 235/450; 235/449; 235/493
[58] Field of Search ..................................... 235/493, 450, 235/449, 491

[56] References Cited

U.S. PATENT DOCUMENTS

| | | | |
|---|---|---|---|
| 3,409,129 | 11/1968 | Sperry | 235/493 |
| 4,480,177 | 10/1984 | Allen | 235/491 |
| 4,500,116 | 2/1985 | Ferro et al. | 235/491 |
| 5,204,526 | 4/1993 | Yamashita et al. | 235/493 |
| 5,220,166 | 6/1993 | Takeuchi et al. | 235/491 |
| 5,362,952 | 11/1994 | Nair et al. | 235/449 |
| 5,473,147 | 12/1995 | Hoshino et al. | 235/449 |
| 5,554,842 | 9/1996 | Connell et al. | 235/491 |

*Primary Examiner*—Donald T. Hajec
*Assistant Examiner*—Douglas X. Rodriguez
*Attorney, Agent, or Firm*—Schwegman, Lundberg, Woessner & Kluth, P.A.

[57] ABSTRACT

Transactional items such as currency, credit cards, identification cards and the like can be provided with enhanced difficulty to forge or counterfeit by the inclusion of magnetic elements within the transactional item. The signal strength, period, amplitude and/or alignment of the magnetic field may be read as coded information by a magnetic reading head. The encoding of this information can be made increasingly difficult to imitate or forge by varying parameters within these (and other) mechanically readable inscriptions. Filaments coated with magnetic particles are particularly useful magnetic elements for inclusion in transactional items because of their ability to be physically aligned, extend across significant dimensions of the transactional item, and their ready inclusion into manufacturing processes for the transactional items.

26 Claims, 2 Drawing Sheets

TRANSACTIONAL ITEM WITH NON-PARALLEL MAGNETIC ELEMENTS

BACKGROUND OF THE INVENTION

1. Field of the Invention

The present invention relates to 1) apparatus readable (mechanically readable) security means to prevent forgery of transactional items, and especially economic transactional items such as identification cards, drivers licenses, currency, credit cards (including the new smart cards with readable chips therein), money orders, checks, tickets and the like, 2) the apparatus which is useful in reading such transactional items, and 3) the process of reading or authenticating code implanted in transactional items. The invention also relates to a secondary device and means for qualifying or approving materials before they will be accepted into a primary device such as a compact disk player, imaging apparatus, CD-ROM drive, floppy, optical or floptical disk drive, and the like.

2. Background of the Art

It is critical to the security of economic systems that the means of implementing economic transactions not be reproducible without providing independent value into that economic system. This is why actions such as forgery, in which false replications are made of economic transactional items such as checks, currency, credit cards and the like, are serious threats to the security interests of people, businesses and nations. There are severe criminal penalties attached to the commission of these crimes of forgery or counterfeiting because of the potential for widespread societal harm from counterfeiting. Unfortunately, technological advances aid the enactment of the crime of forgery as much as it improves the detection of false replications.

The conflict between forgery and detection is hardly new, tracing back further than Greek history, where the proposition of Archimedes' principle was based on an effort to enable detection of forgery. Archimedes was an advisor to the state, which had commissioned the molding of a solid gold crown for a religious ceremony. The authorities wished to assure that the crown was in fact pure gold, but they could not cut into the crown once it had been made as that would have been sacrilegious. While sitting in a bath tub, Archimedes noted the rise and fall of the water level as he lifted various parts of his body in and out of the tub. He predicted that the volume of water displaced was equal to either the volume submerged in the water or the weight of material which floated on the water. The story has it that he ran through the streets yelling "Eureka!" at the discovery, and upon submerging a block of gold equal to the weight of the crown, found that a different volume of water was displaced by the crown than the block of gold. The two items were of different densities and therefore the crown was not pure gold. The forgery was thus detected.

It is much more difficult to detect forgeries today, even with the availability of modern technology. This is especially true where such detection has to be performed in the marketplace (in stores, airports, overseas, etc.) and there is no readily available means for accessing proving technology equivalent to the technology clandestinely used to create the forgery. This makes the forgery of identification cards, currency, credit cards, and the like much easier in today's worldwide economic system.

Magnetic media have already been used in various forms to attempt to prevent forgery of transactional items. U.S. Pat. No. 5,434,917 describes a method for encoding individual signals in plastic cards with randomly distributed ferrite particles.

U.S. Pat. No. 5,430,664 describes a method of verifying and counting items such as currency with both magnetic and optical reading of individual pieces of currency. U.S. Pat. No. 5,444,518 adds only optical information to recorded images to prevent forgery.

U.S. Pat. No. 5,429,911 describes a method for depositing rows of magnetic materials onto a surface by etching grooves and depositing magnetic materials within the grooves.

U.S. Pat. No. 5,418,855 describes a visual method of testing items (including magnetic strips) by marking the item with inks or dyes that fluoresce when illuminated. Microprocessors analyze and compare signals with standards.

U.S. Pat. No. 5,444,370 describes the use of scanning devices on two ordered target tracks having magnetic sensitivity. Each output track provides different output signals.

U.S. Pat. No. 4,114,032 describes a means for reducing forgery in which materials, including fibers coated with magnetic particles, are embedded in a transactional item such as currency or credit cards. The magnetic fibers may be aligned vertically or perpendicularly to the plane of the material within the transactional item, at least when it is manufactured from paper, by having a magnetic field below the paper train. The magnetically filled item is authenticated merely by the presence of magnetic material which will respond to a magnetic plate or the like. A broad range of means for placing magnetic material onto the surface of the fibers is described. The presence of magnetic fibers and magnetic content can be determined by moving the item with respect to scanning means.

U.S. Pat. No. 3,878,367 describes a magnetic security document containing uniformly dispersed magnetic material onto which a magnetic pattern is imposed which can later be identified by scanning means. It is particularly desirable according to the invention to align the magnetizable particles at selected locations during the manufacturing process.

U.S. Pat. No. 3,995,313 describes a data accumulation system which comprises a homogeneous magnetic material which is capable of being magnetized throughout its surface in discrete patterns. The data may be subsequently sensed from recording media.

Modern currency has various systems in place to reduce the ease of forgery, but these systems are far from effective when any significant technological effort is behind an attempt at forgery. Water marks, colored threads, embedded fibers, and high quality printing is used to reduce the ease and likelihood of forgery, but these are minimal deterrents, as is evidenced by the volume of forgery still occurring. Credit cards and identification cards (including driver's licenses) also have visually observable systems which are intended to deter forgery, as well as the magnetic stripes containing individual user information. These systems also include many of the items noted above with respect to security measures taken with currency, and may further embody the use of holographic images, picture identification, and central recording of transactions, including reporting of card theft. As evidenced by the growing volume of credit card and identification card forgery (as opposed to mere credit card theft), these measures are also less than successful. It would be desirable to enhance the security of transactional items.

Other technologies, besides transactional devices and items can make use of the basic technology of the present invention. For example, a dual concern of primary apparatus and machine manufacturers is the insertion of forged or non-qualified materials and media into the primary apparatus. It is not only a matter of forgery, but also a matter of preventing the insertion of materials into the primary apparatus which do not meet the full specifications of the media designed for that particular machine. The reputation of the primary machine becomes diminished when non-qualified devices are used in the machine and damage the machine or at least reduce its performance level. It would therefore be desirable to develop a secondary device that could be used with any primary apparatus into which a medium or element is inserted for use of the primary apparatus, the secondary device identifying and accepting/rejecting the inserted medium.

SUMMARY OF THE INVENTION

The security of transactional items can be enhanced by the implementation of a mechanically readable security system which includes at least a mechanically readable magnetic marking embedded in the transactional item. The marking also may be visually notable or readable, but it at least must be readable by a reading head capable of reading the passage of a magnetic material by the head. The marking is preferably in the form of at least two magnetic filaments or strips and preferably includes a multiple number of filaments of differing coerciveness, magnetic field strength, magnetic field alignment, size and/or spacing so that when the transactional item is passed at a defined and preferably constant speed through the reading device, approval will be given by the apparatus only when the proper signal is provided by the ordered array of appropriate magnetic elements in the transactional item.

DETAILED DESCRIPTION OF THE INVENTION

Elongated magnetic elements are provided which are inserted into economic transactional items or identification cards. These elongated magnetic elements may be filaments, long or intertwined fibers or threads, strips or the like. Preferably they are filaments or very narrow strips, as these can provide the highest degree of security, as will be shown later. It is not necessary that the magnetic elements are recordable, in the conventional magnetic media sense (as in VHS tape, audio tape, floppy disks, and the like), and it is preferred that the filaments be magnetic without intent or capability of information recordation during operation of the security system.

The simplest conceived construction within the present invention is a transactional item having at least two magnetic elements attached to the item, each magnetic element having at least one magnetically readable characteristic or spacing with respect to another magnetic element, such as magnetic strength which can be mechanically read as different from the magnetic strength of another magnetic element, signal duration, magnetic orientation, and the like. The magnetic elements are preferably elongate, continuous and straight (as opposed to curved, sinusoidal and segmented) and provide a similar or consistent signal along its length (e.g., the same field alignment, the same field amplitude, etc.).

The security system is designed so that when the transactional items move relative to a reading head, as where a card moves through the reading device in a controlled direction or the head is moved over the fixed card (e.g., as currency moves through a change machine, with a particular end forward and a particular face pointing up), the magnetic elements are aligned in the transactional items so that they will enter the reading area of the reading device in a particular ordering. This is, for example, most easily done by having the individual elements extend in a continuous line from side-to-side in the currency along the shortest dimension on the face of the currency, perpendicular to or angled (other than perpendicular or parallel) with the longest dimension of the currency. As the currency is passed through the reading machine, the reading area will detect or create a portion of a complete signal when each reading element passes through the reading area. In an easily constructed mode (and therefore the least secure mode), one or two magnetic elements may be so aligned within the currency (or other transactional item) that a monomodal (with one element) or bimodal (with two elements) signal is read by passage of the magnetic elements through the read area, or two signal points are read which are spaced apart at a predetermined dimension so that the frequency (period) determined by the reading of the two signals (the distance between the elements divided by the speed of movement of the transactional item through the reading device) must also match the required frequency (period) for approval of the item.

One type of such system may be described as a transactional item having two sets of parallel edges comprising a first edge set and a second edge set, the transactional item having at least three magnetic elements attached to the item, at least one of said at least three magnetic elements having a magnetic strength (e.g., field intensity) which can be mechanically read as different from the magnetic strength of another magnetic element, at least two of said at least three magnetic elements extending from one edge of an edge set towards the other edge of said edge set with spacing between said at least two magnetic elements, said spacing defining a period (and when evenly spaced a frequency) when said magnetic elements are mechanically read while moving in a direction at a known or determinable rate, the direction being approximated as that defined by a line between edges in said second edge set which line is perpendicular to said edges in said second edge set, and said at least one of said three magnetic elements defining a first amplitude (either signal amplitude or read amplitude, preferably the latter) when said magnetic elements are mechanically read while moving in a direction approximating that defined by said line between edges in said second edge set, which first amplitude is different from an amplitude of another of said at least three magnetic elements when said magnetic elements are mechanically read while moving in a direction approximating that defined by said line between edges in said second edge set.

Another type of this system as described above would have at least four magnetic elements, at least two of said at least four magnetic elements having a magnetic strength which can be mechanically read as different from the magnetic strength of at least two other of said at least four magnetic elements, at least three of said at least four magnetic elements extending from one edge of an edge set towards the other edge of said edge set with spacing between said at least three magnetic elements, said spacing defining a period or frequency when said magnetic elements are mechanically read while moving in a direction approximating that defined by a perpendicular line between edges in said second edge set, and each of said at least two of said at least four magnetic elements defining an amplitude when said magnetic elements are mechanically read while moving in a direction approximating that defined by said perpendicular line between edges in said second edge set, and the amplitude of at least one of said at least four magnetic elements is different from an amplitude of at least two other of said at least four magnetic elements when said magnetic elements are mechanically read while moving in a direction approximating that defined by said line between edges in said second edge set. This system could still be further improved upon by having at least one of said magnetic elements with a width measured along a line between an edge set which is at least 5% greater than the width of another magnetic element, said width of said at least one of said magnetic elements defining a signal duration when said magnetic elements are mechanically read while moving in a direction approximating that defined by said line between edges in said second edge set, which signal duration is different from a signal duration measured from at least two of said at least four magnetic elements when said magnetic elements are mechanically read while moving in a direction approximating that defined by said line between edges in said second edge set. This item could be constructed with at least one of said elements having a colorant attached to said at least one of said elements which fluoresces or phosphoresces when irradiated.

The present invention also describes a process for authenticating a transactional item having at least two magnetic elements within said item comprising a) Moving said transactional item in a first direction relative to at least one magnetic sensing or reading device, b) Placing said at least one magnetic sensing device along a path intersected by said transactional item moving in said first direction so that each of said at least two magnetic elements passes within readable dimensions of said at least one magnetic sensing device, said reading device being capable of determining the presence of a magnetic material (and preferably being capable of measuring the intensity of a signal from a magnetic element, determining the duration of a signal from a magnetic element [or sensing the duration of a signal with sufficient accuracy so that a microprocessor can measure the duration of the signal], and measuring the beginning and ending of a signal with a response time that enables determination of signal duration and gaps between signals so that the period, frequency and/or distance between signals can be measured or calculated from the signal), c) Reading at least one signal from each of said at least two magnetic elements to provide an identification signal, said one signal having at least some components being selected from the group consisting of period (including frequency), amplitude and duration, and d) Comparing said identification signal to a predetermined signal identifying a particular type of transactional item.

The process may include an illumination source to cause dye or pigment in elements (or elsewhere printed) to fluoresce or phosphoresce, and a reading of the emitted spectra to be compared to data on the encoded emission spectra.

A readable dimension, as used in the description of the present invention, simply means that the reading device has sufficient sensitivity to be able to sense the necessary information desired to be read from the element at the particular distance at which the element is passed in relation to the reading device. As the magnetic strength of the element increases, the readable distance or dimension increases with a given magnetic reading element. As the sensitivity of the magnetic reading device increases, the readable distance likewise increases with respect to an element of a given magnetic strength.

Now that the simplest, and therefore least secure arrangement has been identified, with even this system being better than present systems used on international currency to reduce forgery, more detailed and more secure systems may also be described.

As noted, the simplest system may have a single magnetic element or even two magnetic elements which provide a single signal or two bits of information, possibly providing a frequency measurement as well. More secure systems within the scope of this invention would provide multiple magnetic elements which may have different spacing (in a predetermined ordering) between each adjacent element (to provide varying periods between signal readings or between signal maximums), different magnetic intensities on each or various elements to provide different amplitude signals (which may be in combination with different frequency or period signals), and the elements may even be angled from side to side across the transactional item so that reading heads at opposite sides of the transactional item must provide the same signal at different intervals for the item to be approved.

The transactional element may be constructed easily with the magnetic elements included therein by conventional manufacturing techniques. Visually observable threads or filaments are presently in currency, so it should be apparent that modern paper manufacturers currently practice the methodology necessary to include aligned filaments within paper substrates. This can be readily done by feeding magnetic filaments (from which the elements are formed) into the paper making support while the wet fibers are deposited. This will place the filaments within the paper matrix, which will then solidify around the elements.

Similarly, filaments which form the elements may be placed within a mold into which plastic is injected to solidify into a credit card, identity card or the like. Where the transactional item is to be formed by lamination, it is a simple task to place the filaments forming the elements between the layers to be laminated, then securing the elements into place by bonding, adhering (with or without additional adhesive materials between the layers) or fusing the layers in the laminate. Generally sufficient tension should be maintained on the filaments when they are placed into position so that they will retain the accuracy of their position during finishing of the transactional item and remain in the preferred straight position. This is most easily achieved with lamination techniques where tension may be maintained on both ends of the filaments during the lamination process and then trimmed after the process. The elements may also be prepared in advance in sheets or strips which can be more readily inserted into the final element. For example, large area sheets (contining a sufficient amount of area to provider material for twenty or more transactional items) may be constructed with the magnetic elements coextruded with the sheet formation. The large area sheet may then be converted, cut into the appropriate size insert with the elements appropriately located within each of the cut portions, and the cut portions then interlaid between the faces of the transactional item to be secured around the insert.

One of the unique advantages of this system is that different denominations of currency may have different codes associated with them, yet each denomination can be read by the same reading device which would identify the denomination of the bill as well as authenticate it. Even more advantageous is the fact that if different international currencies used this anti-forgery security system, the same machine could be programmed to read all of the currencies entered into the machine for approval. Thus an international bank, airport bank, currency changers, and others who regularly accept international financial transactional items could authenticate such items readily on the premises, with a much higher degree of certainty than mere visual inspection could provide.

It is less preferred, but well within the skill of the artisan in practicing this invention, to uniquely vary combination(s) of period, amplitude and duration to allow for individual coding of transactional items. For example, the magnetic filaments may be positioned to provide an encoded or unencoded checksum with the document's identification or serial number.

It is also possible to provide some degree of visual inspection to the transactional item. This could be done by simply coloring the individual elements. There are, however, even better means available for improving security in addition to the magnetic readout. Elements, in addition to their magnetic content, may also have a second machine-readable or visually-readable content within them. For example, a thin coating may be placed on the element which would not interfere with magnetic readout, and would even protect the element from physical wear, extending the possible use life of the transactional item. This thin coating could contain materials which contained color (dye or pigment) or which materials could alter their color upon treatment. It would of course be preferred if the color change were reversible or temporary. Temporary coloration could be provided, for example, by phosphorescent or fluorescent materials which would emit specific wavelengths of radiation when illuminated or heated. These could be at either or both visual and/or mechanical readable wavelengths and intensities. By combining the magnetic readable signals with mechanically readable electromagnetic spectrum radiation (e.g., color) emitted signals, a very secure anti-forgery system could be readily devised.

Figure 1:
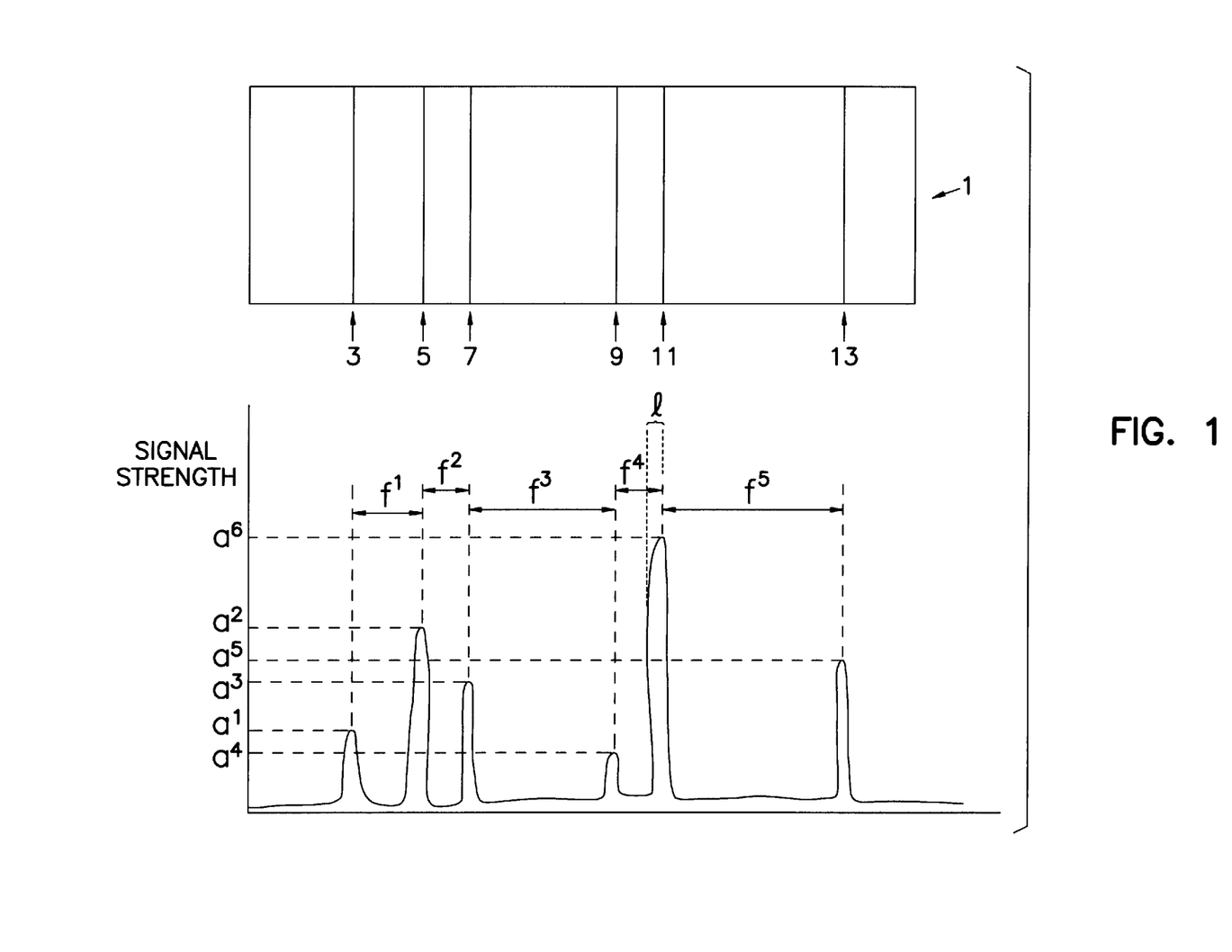
FIG. 1 shows a transactional item 1 with a graph of its read signals in dropped register to elements (3, 5, 7, 9, 11 and 13) in the transactional item 1.

The effects of different element and content ordering within the transactional items can be expanded upon as follows. FIG. 1 shows a transactional item 1 having six magnetic elements (3, 5, 7, 9, 11, and 13) arranged perpendicularly to the longest dimension of the item 1. By providing different strength magnetic materials on each element, six different signals with differing amplitudes (a1, a2, a3, a4, a5, and a6 will be provided. Additionally, there will be 5 different period (or when equally spaced, frequency) signals provided (f1, f2, f3, f4, and f5). These signals are arbitrarily represented in FIG. 1 as to amplitude and period, and can be designed with any number of elements with any variety of variation, which would provide an endless number of codes available to protect transactional items. By varying the thickness of the individual elements (e.g., Element 11), a third signal 1 determined as the length of the signal (endurance) can be generated. This would require a more refined reading program than the relatively simple program necessary for amplitude and frequency, but this would greatly increase the security of the system, without greatly complicating manufacture of the elements or transactional items (by merely providing wider elements). These magnetic signals, as indicated above, can be combined with color emission signals to provide additional complexity to the encoding of the transactional items.

The individual elements used in the security systems of the present invention can be manufactured by a number of different means. Filament, fiber or thread can be coated in a vacuum chamber with magnetic material, magnetic particles can be dispersed within dissolved polymeric binder and the filament extruded with sufficient magnetic content in the filament composition, magnetic particles may be electrostatically deposited onto filament and fused thereon, magnetic coatings may be vapor deposited onto the filament, and a fluidized bed of magnetic particles can be used to deposit particles onto the filament (fluidization effected by pulsed magnetic flux, electrical field flux, or other physical means which will fluidize the magnetic particles and bond them to the element support). It is also possible to form strips by conventional coating or extrusion of a support layer (e.g., polyester such as polyethylene terephthalate or polyethylene naphthalate) and then slitting the film into the appropriate size filaments. Where the filaments are extruded, readable color content also may be added directly into the binder. Where the magnetic particles are fused or bonded to the filament (or film) surface, color readable particles may be randomly and proportionately mixed into the magnetic particles. Where film is slit, a separate coating layer of color readable material may be provided onto the substrate before or after application of the magnetic layer. The color readable layer could be between the film base and the magnetic material where the film base and/or the magnetic coating was transparent, allowing transmission of an optical signal through one or preferably both of the layers.

The magnetic materials and particulates preferably used in the practice of the present invention should range from those which magnetize easily but not permanently (e.g., Permalloy™) to those which possess a highly stable magnetism (e.g., certain stable rare earth metals including Neodymium and Samarium, and ferrite magnetic compounds which have an essentially permanent magnetism which is not easily altered by external fields of moderate to weak intensity). Different magnetic materials may be used in the various magnetic elements in the transactional item, with different mechanical reading heads chosen which are capable of responding to or sensing only selected materials. Filaments composed of highly stable magnetic materials as described above may have the permanent magnetic field aligned with respect to the axis of the fiber before or after being incorporated into the transactional item. The alignment of the signal can also be read as an additional security identifier. The magnetic field of the elements should generally be sufficiently strong to be read easily (with some safety factor for decreases in strength over the life expectancy of the transactional item), yet not be so strong as to attract environmental contaminants to the transactional item. The last limit is one of convenience and cleanliness rather than one affecting the functional utility of the system.

When high strength and permanent magnetic materials are used in the magnetic elements, the verification process may be enhanced in its ability to be distinguished from magnetic inks. If the transactional item is passed through a moderate strength magnetic field before the transactional item is read, the traditional inks can be distinguished from the strong and permanent elements. The traditional and commercially available inks will not retain a high level of magnetism whereas the high strength and permanent magnetic elements will neither show a permanent loss of strength nor lose its field alignment.

The reading device must at least be capable of reading the frequency or the amplitude or duration of the signals independently. This is easily accomplished as this capacity is readily available in conventional magnetic reading devices. It is preferred that the reading device be capable of reading at least two or even three of these qualities of the signals. It is even more preferred that the reading device include an optical reading function, such as the illumination/ fluorescence measuring system described in U.S. Pat. No. 5,418,855. The combination of these four distinct codable entries (frequency, amplitude, duration and emission) would provide a very high level of security to currency and other transactional items such as cash cards or credit cards. It would even be possible to have different series of magnetic codes provided for each series of currencies or each charge level of credit card. The coding in the magnetic elements could then be related to the numeration of the individual series of bills, and the codes changed regularly. For example, the series of bills having numbers between, for example, A 00000000 A and A 01000000 A could have a specific code of frequency, amplitude, duration and coloration, and this code would change when bills having numbers between A 01000001 A and A 02000000 A were printed. Upgrades on the code signals would then be provided to each placement of reading device, old currency withdrawn, and the security of the currency would be further enhanced by regular changes in the code. It is desirable in this system to have currency or credit cards replaced regularly in normal transactional events. This provides a side benefit of making laundering and counterfeiting more difficult, and can trace the flow of specific currency or cards more readily if the numbers of the bills were also read (as by conventional scanning equipment used in office word processing stations) and the numbers recorded in the authentication of the bills. The combination of the in-place security system and a central location for record analysis or comparison is also within the skill of the artisan. For example, the in-place security authenticating device can be connected through lines to a central processing station. Other aspects of the transaction can be combined with the authentication step through the central processing station.

The security of the system could be further enhanced by having at least some of the magnetic elements lying at an angle other than perpendicular with respect to the edges of the item. If the elements were placed at, for example, an angle of fifteen degrees off perpendicular (75 degrees), and two separate magnetic reading heads were placed evenly at the sides of the transactional item as it was moved through the reading apparatus, the same signal (with respect to intensity and duration) would be generated from each element at each head, but at a different time. By encoding the time separation between the two heads (that is the time lapse or period between when each identical piece of the information is read by each head), an additional level of security can be generated. This level of security can be readily heightened with additional position alterations in the elements. For example, if the elements were angled at various specific angles (e.g., Element 3 at 80 degrees, 5 at 70 degrees, 7 at 90 degrees, 9 at 75 degrees, etc.), the total or combined signals read by each head would have both similar features (e.g., Amplitude) and different features (e.g., Period). Therefore, two different encoded signals must be met in the same transactional item at the different heads. The level of complexity in the formation and reading of these signals is actually rather small, but the ability to fraudulently reproduce them by other than highly sophisticated technology is significantly reduced.

Figure 2:
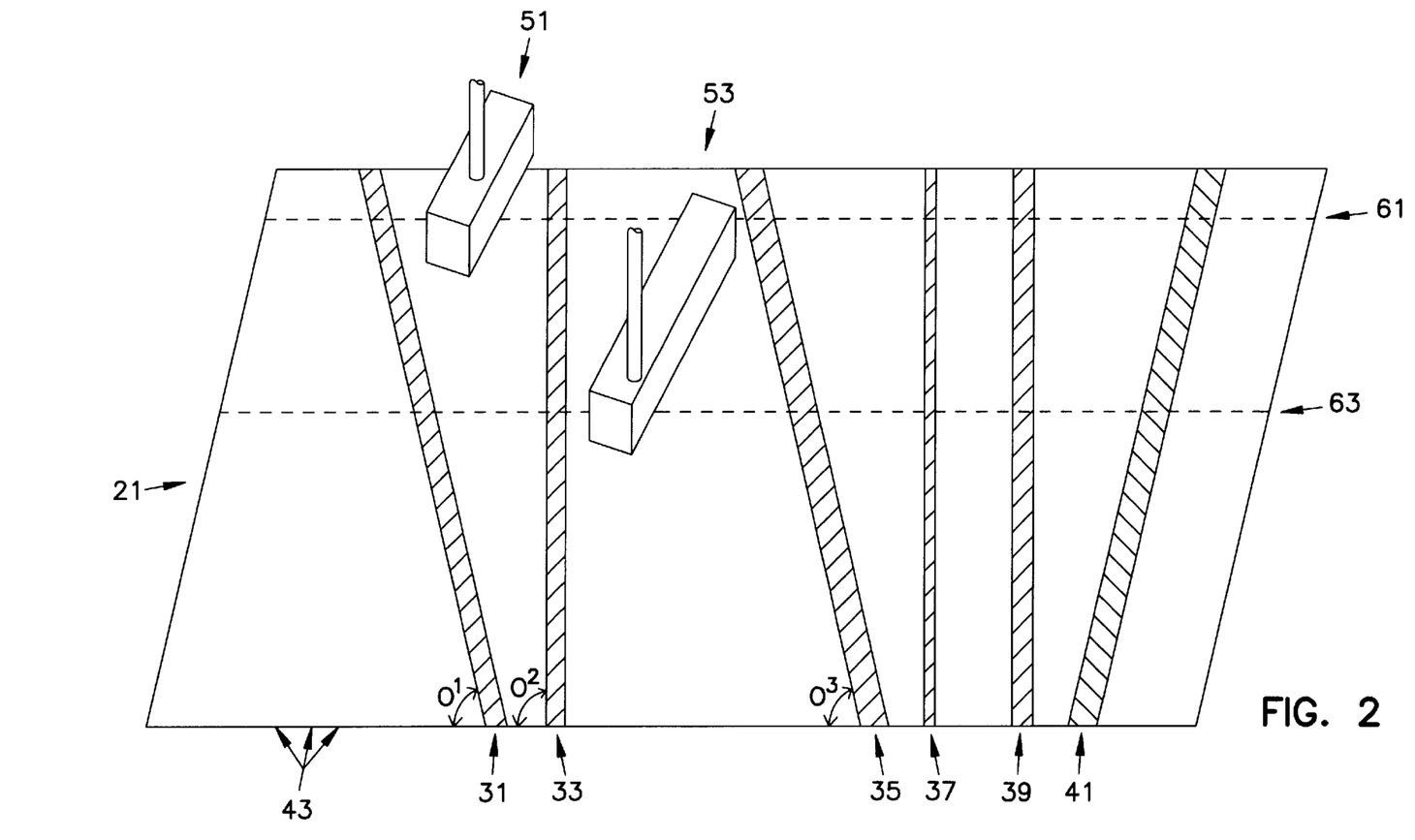
FIG. 2 shows a transactional item 21 being read by two longitudinally offset magnetic reading heads (51 and 53).

FIG. 2 shows an even more complex and therefore less readily counterfeited transactional item 21. This transactional item 21 has six readable elements (31, 33, 35, 37,39 and 41). The angle of the individual readable elements (e.g., 31,33 and 35) with a side edge 43 of the transactional item 21 may differ from element to element. Element 31 may form angle $O^1$, 33 may form angle $O^2$, and 35 may form angle $O^3$. As a first magnetic reading head 51 is moved along a path 61 on one side of the transactional item 21, a specific signal comprising frequency, amplitude and duration is generated by the passage of the head 51 across the path 61. Because of the different angles formed by the various elements (31,33,35,37,39, and 41), the frequency read by a second magnetic reading head 63 would be different from the frequency read by the first magnetic reading head 61. The amplitude and the duration read by the two heads (61 and 63) could, however, be the same. They could be different if the width of the individual elements varied and/or the strength of the magnetic coating varied along the length of the elements (although this becomes a less easily controlled level of complexity in manufacturing). A third magnetic reading head (not shown) could also be added at an intermediate position and this would provide a third signal with varying frequency from the first two signals.

Because the coding of the magnetic elements is within the discretion of the manufacturer, the design and alignment of the elements is not strictly limited to arrangements specifically shown in the Figures. For example, since currency is generally manufactured in large sheets which are subsequently slit into individual bills, at first blush the use of magnetic elements which angle across the sheets might appear to be unworkable. Where two reading heads are used, such transactional items which have the elements in the same angle, but not in the same order or position (as would be the result of an element extending across the entire printed sheet before slitting and crossing over other elements), can well be identified by a standard code. If the code reads the ordering of only those perpendicular elements, does not read the frequency or period of angled elements, and compares only the amplitude and duration (and different time between signals at one edge versus another edge on the item, a result of the angling across the item and the different orientation of the reading heads with respect to the leading edge of the item as being scrutinized by the reading device), that element may also have an identifiable code aspect within the authentication system. Both reading heads would identify the amplitude and duration of the same element (as approximately the same), and then the time lag of one part of the element (read by the first head) with respect to a specific other element would be compared with the time lag of another part of the element (read by the second head). A comparison of the different time lags with respect to a specific vertical element within the transactional item would be an indicator of the angle of the angled element. The angle of the element, without respect to its specific location relative to one or more other elements, would then become an additional component of the encoded information.

It is also noteworthy to point out the advantages against forgery this system provides as compared to protection provided by magnetic stripes which are read, as are commonly used with credit cards. It is quite easy to read the signal from a magnetic strip, paint a magnetic stripe on a forged card, and transfer the read information back to the forged card. It would be far more difficult to attempt to read the positioning and strength of filamentary elements in a card, and then place such filaments within a card with the same totality of response characteristics. This is particularly true where the elements are angled and the card is read by two displaced reading heads on opposite sides of the card.

As noted earlier, the essential technology of the present invention may be used for more than just transactional media, but may be used with primary apparatus to prevent the insertion of media that has not been approved or qualified for that particular primary apparatus. An example of a particular use for this aspect of the invention would be for photothermographic imaging materials (e.g., DryView™ Medical Imaging film, Imation, Inc., St. Paul, Minn.) and thermal mass/dye transfer ribbons. Both of these imaging systems use thermal procedures in the generation of the final images because of the relatively high temperatures used (e.g., greater than 125° C., volatiles are generated during the processing. The primary apparatus for using the media comanufactured by the apparatus manufacturer or marketer has acceptable levels of emissions and appropriate types of emissions for the design characteristics of the primary apparatus. Competitive media or knock-off media is not likely to have the same attention to emission concerns, or may not be able to match acceptable emissions because of manufacturing deficiencies. It would be highly beneficial to the success of the primary apparatus system to assure that only acceptable media is inserted into the primary apparatus. Through practice of another aspect of the present invention, this can be accomplished.

Looking at FIG. 1, the figure of a transactional item shown in the Figure can also represent a patch or insert (e.g., from 1×2 mm, up to about 2×5 cm) comprising a plastic film having embedded therein the distribution of magnetic elements described in the practice of the present invention. The patch or insert may be taped, fused or further embedded within the structure of the media. Where used with a compact disk, for example, the outer edge of the disk may have a small patch of a multifilament patch embedded into an outer edge (or other portion) of the disk. The CD player may have a miniature version of the reading system of FIG. 2 within the CD player. As the disk spins within the player, the reading system (a secondary device or apparatus within the primary apparatus) reads that portion of the disk where the identifying/qualifing patch is supposed to be. If the disk player reads no signal or an improper (attempted forgery) signal, a warning signal or stopping signal is sent through the primary apparatus. This warning or stopping signal can, of course, direct the primary apparatus to perform any number of specific tasks. The available tasks include stopping the operation of the primary apparatus in whole or in part, alerting an operator that a non-qualified or improperly identified medium has been inserted, cause a second reading attempt to be made or an adjustment in the location of the reading attempt made, and the like. This simple addition to the primary apparatus can greatly safeguard the primary apparatus against damage from the use of improper materials within the system.

An example of the best mode of the present system contemplated by the inventor at the time of filing for this invention is:

High strength polyester (polyethyleneterephthalate) filament having a diameter of 0.1 mm is used for all samples unless it is indicated that polyester filaments of 0.2 mm are used.

Magnetic coatings are to be applied to the filaments by conventional vapor deposition or coating of the polyester filaments with a coating solution of particulate (e.g., less than 0.05 mm) magentic Permalloy™ particles in a dissolved binder which adheres satisfactorily to polyester (e.g., another polyester).

Conventional reading heads from audio or video equipment may be modified (particularly in their alignment) to read the items containing the magnetic elements of the constructions of the present invention.

One filament of a pair of 0.1 mm filaments is coated with Permally™ by vapor deposition (filament 1) and the other (filament 2) is coated with a lower surface area density of the same magnetic material by solution coating with a 10% solids solution of 5% by weight magentic particles and 5% by weight polyester binder. The magnetic field generated by the two different filaments will therefore vary by a factor of at least 5 from the higher intensity (vapor deposited) filament to the lower intensity (solution coated) filament.

A second pair of filaments having diameters of 0.2 mm are similarly treated by the two different processes so that another pair of different diameter filaments is provided with two different field strengths, filament 3 having the higher field density vapor deposited coating and filament 4 having the lower field density solution coated magnetic coating.

A patch may be prepared by arranging the filaments in the desired orientation such as, reading left-to-right (with the relative angle of the filament with respect to the bottom edge of a film of polyvinyl chloride indicated in parentheses), filament 1 (90), filament 2 (90), filament 3 (75), filament 1 (75), anf filament 4 (90). A second film of polyvinyl chloride may be carefully laid over the first layer with the filaments oriented thereon, and the two layers of vinyl resin fused by the application of heat and pressure to laminte the filaments between the sheets of vinyl. This would secure the filaments in a fixed relationship within the vinyl resin. This procedure may be repeated to make as many patches as needed. A segment of the laminate is cut out, leaving the filaments in a predetermined relationship within the laminate. The code is read by a magnetic head and the signal recorded. The signal would identify the ordering, intensity, duration and period amongst and between the filaments. Two offset heads would be necessary to read the angularity data capable of being provided by the angled filaments. Two magnetic reading heads from an audio tape deck may be assembled on a small platen, equidistant from an edge, with conventional signal translating devices still attached to the heads. This portable prototype device could be carried from apparatus to apparatus, if needed. The signal reading portion would be provided with the ability to compare signals (any PCU can accomplish this). The patch from which the signal has been read and recorded would be cut from the laminate and then applied to the outermost edge of a CD. The portable reading unit would then be carefully inserted into the CD player, with the heads located at the reading position of the the expected location of the patch on the outer edge of the CD. The CPU device is set up so that when a signal is read, if that signal is properly correleated with the recorded signal, the electrical circuitry of the CD player is maintained in a closed position. If the signal read from the patch does not match the recorded signal, the CPU is programmed to open the circuits of the CD player and turn it off.

As can be seen, this is a simple secondary apparatus design, easily manufactured, and easily retrofitted into existing equipment. Where the primary apparatus does not rapidly move the medium to be screened or qualified for use, the magnetic heads may be at an input point (insertion point) in the apparatus so that the act of inserting the film or element into the primary apparatus (with or without automatic feeding features as in modern Video cassette players) can be the point at which the medium or element is qualified for play or use in the primary apparatus.

What is claimed:

1. A transactional item having at least a first and second magnetic element permanently attached to the item, each magnetic element comprising a filament or strip, said first magnetic element having at least one magnetic property along the length of said filament or strip or physical spacing from said second magnetic element which can be mechanically read as different from the magnetic property or position of the second magnetic element, said transactional item having at least two edges which are parallel to each other, said first magnetic element being perpendicular to said at least two edges which are parallel to each other and said second magnetic element being at an angle other than perpendicular with respect to said at least two edges.

2. A transactional item having two sets of parallel edges comprising a first edge set and a second edge set, said transactional item having at least three magnetic elements attached to the item, at least one of said at least three magnetic elements having a magnetic strength which can be mechanically read as different from the magnetic strength of another magnetic element, at least two of said at least three magnetic elements extending from one edge of an edge set towards the other edge of said edge set with spacing between said at least two magnetic elements, said spacing defining a period when said magnetic elements are mechanically read while moving in a direction approximating that defined by a lie between edges in said second edge set, and said at least one of said three magnetic elements defining a signal amplitude when said magnetic elements are mechanically read while moving in a direction approximating that defined by a line between edges in said second edge set which is different from an amplitude of another of said at least three magnetic elements when said magnetic elements are mechanically read while moving in a direction approximating that defined by a line between edges in said second edge set, said transactional item having at least two edges which are parallel to each other, one of said at least three magnetic elements being perpendicular to said at least two edges which are parallel to each other and one of said at least three magnetic elements being at an angle other than perpendicular with respect to said at least two edges, the difference from perpendicularity in one of said at least three magnetic elements being mechanically readable.

3. The item of claim 2 wherein no more than two of said at least three magnetic elements are parallel to each other.

4. The item of claim 2 wherein at least two of said at least three magnetic elements are not parallel to each other.

5. The item of claim 2 where there are at least four magnetic elements, at least two of said at least four magnetic elements having a magnetic strength which can be mechanically read as different from the magnetic strength of at least two other of said at least four magnetic elements comprising a first magnetic element, a second magnetic element, a third magnetic element, and a fourth magnetic element, at least three of said at least four magnetic elements extending from one edge of an edge set towards the other edge of said edge set with spacing between said at least three magnetic elements, said spacing defining a period when said magnetic elements are mechanically read while moving in a direction approximating that defined by a line between edges in said second edge set, and each of said at least two of said at least four magnetic elements defining a signal amplitude when said magnetic elements are mechanically read while moving in a direction approximating that defined by a line between edges in said second edge set which is different from an amplitude of at least two of said at least four magnetic elements when said magnetic elements are mechanically read while moving in a direction approximating that defined by a line between edges in said second edge set said transactional element having at least two edges which are parallel to each other, said first magnetic element being perpendicular to said at least two edges which are parallel to each other and said second magnetic element being at an angle other than perpendicular with respect to said at least two edges.

6. The item of claim 2 wherein at least one of said elements has a colorant attached to said at least one of said elements which fluoresces or phosphoresces when irradiated.

7. The item of claim 3 wherein at least one of said elements has a colorant attached to said at least one of said elements which fluoresces or phosphoresces when irradiated.

8. The item of claim 4 wherein at least one of said elements has a colorant attached to said at least one of said elements which fluoresces or phosphoresces when irradiated.

9. The item of claim 5 wherein at least one of said elements has a colorant attached to said at least one of said elements which fluoresces or phosphoresces when irradiated.

10. The item of claim 5 wherein at least two of said at least four magnetic elements are not parallel to each other.

11. The item of claim 2 wherein the width of at least one of said elements has a width measured along a line between an edge set which is at least 5% greater than the width of another element.

12. The item of claim 5 wherein the width of at least one of said elements has a width measured along a line between an edge set which is at least 5% greater than the width of another element, said width of said at least one of said elements defining a duration when said magnetic elements are mechanically read while moving in a direction approximating that defined by a line between edges in said second edge set, which duration is different from a duration measured from at least two of said at least four magnetic elements when said magnetic elements are mechanically read while moving in a direction approximating that defined by a line between edges in said second edge set.

13. The item of claim 12 wherein at least one of said elements has a colorant attached to said at least one of said elements which fluoresces or phosphoresces when irradiated.

14. A process for authenticating a transactional item as recited in claim 2 having at least three magnetic elements within said item comprising a) moving said transactional item in a first direction, b) placing at least two magnetic sensing devices along a path intersected by said first direction so that each of said at least three magnetic elements passes within readable dimensions of said at least two magnetic sensing devices, said reading device being capable of determining the presence of a magnetic material, c) reading at least two signals from each of said at least two magnetic elements, said signal having at least some components being selected from the group consisting of period, magnetic field alignment, amplitude and duration, and d) comparing said signals to a predetermined signal identifying a particular type of transactional item whereby, a complete set of signals in response to said transactional item from one of said at least two of said magnetic sensing devices being different from a complete set of signals from another magnetic sensing device because of different angularity between at least two magnetic elements and different positions of said at least two magnetic sensing devices with respect to said transactional item.

15. A process for authenticating a transactional item having at least four magnetic elements within said item comprising
   a) moving said transactional item in a first direction relative to at least two magnetic sensing devices,
   b) placing said at least two magnetic sensing devices along a path intersected by said first direction so that each of said at least four magnetic items passes within readable dimensions of said at least two magnetic sensing devices, said reading devices being capable of determining the presence of a magnetic material,
   c) reading at least two signals from each of said at least four magnetic elements, said signal having at least some components being selected from the group consisting of period, magnetic field alignment, amplitude and duration, and
   d) comparing said at least one signal to a predetermined signals identifying a particular type of transactional items whereby,
a complete set of signals in response to said transactional item from one of said at least two of said magnetic sensing devices being different from a complete set of signals from another magnetic sensing device because of different angularity between at least two magnetic elements and different positions of said at least two magnetic sensing devices with respect to said transactional item.

16. The process of claim 15 wherein said signal has components comprising at least period and amplitude.

17. The process of claim 16 wherein said signal has components comprising at least period, amplitude and duration.

18. The process of claim 14 wherein at least one of said at least two magnetic elements has a colorant attached thereto which fluoresces or phosphoresces when irradiated and both an irradiating device and light detection device capable of detecting fluorescing or phosphorescing radiation lies along said path, said irradiating device irradiating said item and said light detection device detecting fluorescing or phosphorescing radiation and comparing signals from said detecting which are compared to stored signals which define a particular type of transactional item.

19. The process of claim 15 wherein at least one of said at least two magnetic elements has a colorant attached thereto which fluoresces or phosphoresces when irradiated and both an irradiating device and light detection device capable of detecting fluorescing or phosphorescing radiation lies along said path, said irradiating device irradiating said item and said light detection device detecting fluorescing or phosphorescing radiation and comparing signals from said detecting which are compared to stored signals which define a particular type of transactional item.

20. The item of claim 1 wherein said magnetic property is selected from the group consisting of field strength, orientation, and duration.

21. A first apparatus which accepts an article for use within said first apparatus,
   an article for use within said apparatus,
   said article for use within said apparatus having in at least a portion thereof an item having two sets of parallel edges comprising a first edge set and a second edge set, said article having at least three magnetic elements attached to the item, at least one of said at least three magnetic elements having a magnetic strength which can be mechanically read as different from the magnetic strength of another magnetic element, at least two of said at least three magnetic elements extending from one edge of an edge set towards the other edge of said edge set with spacing between said at least two magnetic elements, said spacing defining a period when said magnetic elements are mechanically read while moving in a direction approximating that defined by a line between edges in said second edge set, and said at least one of said three magnetic elements defining a signal amplitude when said magnetic elements are mechanically read while moving in a direction approximating that defined by a line between edges in said second edge set which is different from an amplitude of another of said at least three magnetic elements when said magnetic elements are mechanically read while moving in a direction approximating that defined by a line between edges in said second edge set,
   said item having atleast two edges which are parallel to each other, one of said at least three magnetic elements being perpendicular to said at least two edges which are parallel to each other and one of said at least three magnetic elements being at an angle other then perpendicular with respect to said at least two edges, the difference from perpendicularity in one of said at least three magnetic elements being mechanically readable,
   said first apparatus having attached thereto a second apparatus capable of reading signals from the elements in said item,
   said second apparatus having means to send signals read from said item to a means which can compare signals read from said item to at least one predetermined set of signals,
   comparing said signals read from said item to said predetermined set of signals,
   causing said first apparatus to start, continue or alter its operation depending upon said signal read from said item having sufficient correspondence to said predetermined set of signals.

22. The apparatus of claim 21 wherein said first apparatus comprises an apparatus selected from the group consisting of audio CD players, video CD players, imaging apparatus, and information recording systems.

23. The apparatus of claim 21 wherein said item has dimensions of width and length which are between 1 mm and 5 cm.

24. The apparatus of claim 22 wherein said item has dimensions of width and length which are between 1 mm and 5 cm.

25. A transactional item comprising a paper article having two sets of parallel edges comprising a first edge set and a second edge set, said transactional item having at least three magnetic elements embedded in the paper matrix, at least one of said at least three magnetic elements having a magnetic strength which can be mechanically read as different from the magnetic strength of another magnetic element, at least two of said at least three magnetic elements extending from one edge of an edge set towards the other edge of said edge set with spacing between said at least two magnetic elements, said spacing defining a period when said magnetic elements are mechanically read while moving in a direction approximating that defined by a line between edges in said second edge set, and said at least one of said three magnetic elements defining a signal amplitude when said magnetic elements are mechanically read while moving in a direction approximating that defined by a line between edges in said second edge set which is different from an amplitude of another of said at least three magnetic elements when said magnetic elements are mechanically read while moving in a direction approximating that defined by a line between edges in said second edge set, said transactional item having at least two edges which are parallel to each other, one of said at least three magnetic elements being perpendicular to said at least two edges which are parallel to each other and one of said at least three magnetic elements being at an angle other then perpendicular with respect to said at least two edges, the difference from perpendicularity in one of said at least three magnetic elements being mechanicallly readable, said first magnetic element being perpendicular to said at least two edges which are parallel to each other and said second magnetic element being at an angle other than perpendicular with respect to said at least two edges, the difference from perpendicularity in said second magnetic element being mechanically readable.

26. The transactional item of claim 25 wherein said item comprises currency.

* * * * *